United States Patent [19]

Deguchi et al.

[11] Patent Number: 4,832,576
[45] Date of Patent: May 23, 1989

[54] ELECTRIC FAN

[75] Inventors: Yutaka Deguchi; Hideo Momohara; Yasuyuki Tsuchida; Toshio Ootani; Yuji Nakanishi, all of Hyogo, Japan

[73] Assignee: Sanyo Electric Co., Ltd., Japan

[21] Appl. No.: 866,209

[22] Filed: May 22, 1986

[30] Foreign Application Priority Data

May 30, 1985 [JP] Japan .................................. 60-117577
Jan. 20, 1986 [JP] Japan .................................. 61-8087

[51] Int. Cl.⁴ ...................... F04B 49/06; F04B 17/00; H02K 9/00
[52] U.S. Cl. .................................. 417/45; 417/423.7; 417/423.14; 318/314; 318/340; 310/63; 310/68 B
[58] Field of Search ...................... 417/45, 410, 423 R, 417/423 G, 423 T, 424 R; 318/254, 305, 314, 340, 461; 310/63, 68 B

[56] References Cited

U.S. PATENT DOCUMENTS

| 3,446,429 | 5/1969 | Suzuki et al. | 416/220 R |
| 3,481,533 | 12/1969 | Trouilhet | 310/40.5 |
| 4,511,828 | 4/1985 | Wada | 318/254 |

FOREIGN PATENT DOCUMENTS

| 0032441 | 1/1981 | European Pat. Off. |
| 0146673 | 4/1981 | European Pat. Off. |
| 2065393 | 12/1980 | United Kingdom |
| 2071940 | 2/1981 | United Kingdom |
| 2103034 | 7/1981 | United Kingdom |
| 2102222 | 7/1982 | United Kingdom |
| 2126026 | 8/1983 | United Kingdom |
| 2146860 | 7/1984 | United Kingdom |

Primary Examiner—Carlton R. Croyle
Assistant Examiner—Timothy S. Thorpe
Attorney, Agent, or Firm—Darby & Darby

[57] ABSTRACT

An electric fan comprises a rotary shaft supported on a mounting base plate. The rotary shaft is extended through a cylindrical stator and on a tip of the rotary shaft, the bottom of a cup-shaped rotor yoke as well as an impeller are secured. The stator is enclosed in the rotor yoke, on whose inner wall an anisotropic rotor magnet magnetized in the reverse polarity alternately in its circumferential direction is secured. The stator and the rotor form a DC brushless motor, whereby the impeller is rotated through the rotation of the rotor and the rotary shaft. In the proximity of the rotor magnet, there is provided a hall integrated circuit (IC), through which a rotating position of the rotor may be detected. On the basis of the rotating position signal from the hall IC, a microcomputer controls the current flowing period in such a manner that the current flowing through the stator coil will partly overlap between each phase. A separate microcomputer adjusts the voltage applied to the DC brushless motor and controls the wind velocity.

24 Claims, 11 Drawing Sheets

ELECTRIC FAN

BACKGROUND OF THE INVENTION

1. Field of the Invention

The present invention relates to an electric fan. More specifically, the present invention relates to a novel electric fan using a DC brushless motor for driving an impeller.

2. Description of the Prior Art

An electric fan is disclosed, for example in U.S. Pat. Nos. 3,446,429; 3,481,533 and so on. Since these electric fans are all using an induction motor, a starting torque is small, thus difficulty being encountered in starting at low speed.

When started at low speed, therefore, a starting compensating circuit is required to shift to the low speed after once driven at high speed as disclosed, for example, in Japanese Utility Model Publication No. 46164/1975. Thus, in the conventional electric fan using an induction motor, complicated circuit should be utilized to enable the starting at low speed.

In the conventional electric fan using the induction motor, since torque is small at low speed and the lower limit of the normally driveable speed is high, a so-called ultralow speed driving is impossible.

Moreover, the use of an induction motor increases the outside diameter of the motor and causes the larger proportion of that portion relative to the outside diameter of the impeller, thereby blocking the wind and deteriorating the fan efficiency.

SUMMARY OF THE INVENTION

It is, therefore, a principal object of the present invention to provide a novel electric fan capable of dissolving all inherent disadvantages of a conventional electric fan using an induction motor.

It is a further object of the present invention to provide a novel electric fan using a DC brushless motor for driving an impeller.

It is a still further object of the present invention to provide an electric fan having a good starting characteristic at low speed, without having a complicated starting compensating circuit.

It is another object of the present invention to provide an electric fan drivable at ultra-low speed.

It is still another object of the present invention to provide an electric fan having an improved fan efficiency for an impeller.

In brief, the present invention is an electric fan comprising an impeller which produces the wind by the rotation thereof, a DC brushless motor having a rotary shaft to which the impeller is coupled and including a coil and a magnet, means for applying a driving voltage to the coil of the DC brushless motor, a plurality of magnetic sensing elements disposed relative to the magnet of the DC brushless motor, a phase control means for controlling the applied phase of the driving voltage on the basis of the signal from the magnetic sensing elements, a designating means for designating an operating condition, and a voltage control means for controlling the voltage applied from the applying means on the basis of designating from the designating means.

The operating condition, for example, such as "strong wind" or "mild wind" is commanded through the designating means, thus a signal for speed control is outputted from the designating means. According to the signal, the voltage control means controls the voltage applied to the DC brushless motor by the driving circuit. As the DC brushless motor rotates, the magnetic sensing elements output signals representing positions thereof, and based thereupon the phase control means controls the applied phase of the voltage described above. The DC brushless motor, therefore, rotates at the number of rotation responsive to the voltage being applied and drives the impeller at its designated speed.

According to the present invention, since the DC brushless motor is utilized as the motor for driving the impeller instead of the conventional induction motor, its occupying capacity may be considerably reduced. Therefore, in the electric fan in accordance with the present invention, the air volume blocked by the DC brushless motor itself is minimized, so that the fan efficiency of the impeller may be improved as compared with the conventional using the induction motor. Furthermore, the DC brushless motor has a large starting torque at low speed, thus the electric fan according to the present invention may be started directly at low speed without having any starting compensating circuit. In addition, as the DC brushless motor has the large torque even in a low speed area, the electric fan according to the present invention may be operated at lower speed when compared with the conventional one using the induction motor, thus the mild operation such as "breeze" or "ultra-breeze" may be possible.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
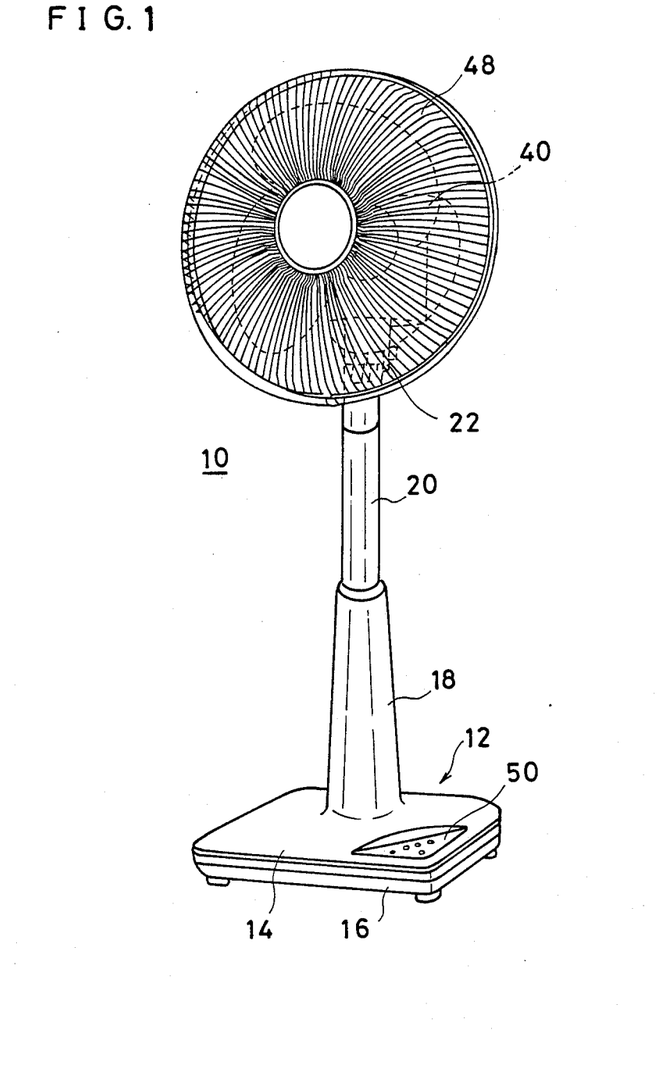
FIG. 1 is an external view showing one embodiment in accordance with the present invention.
Figure 2:
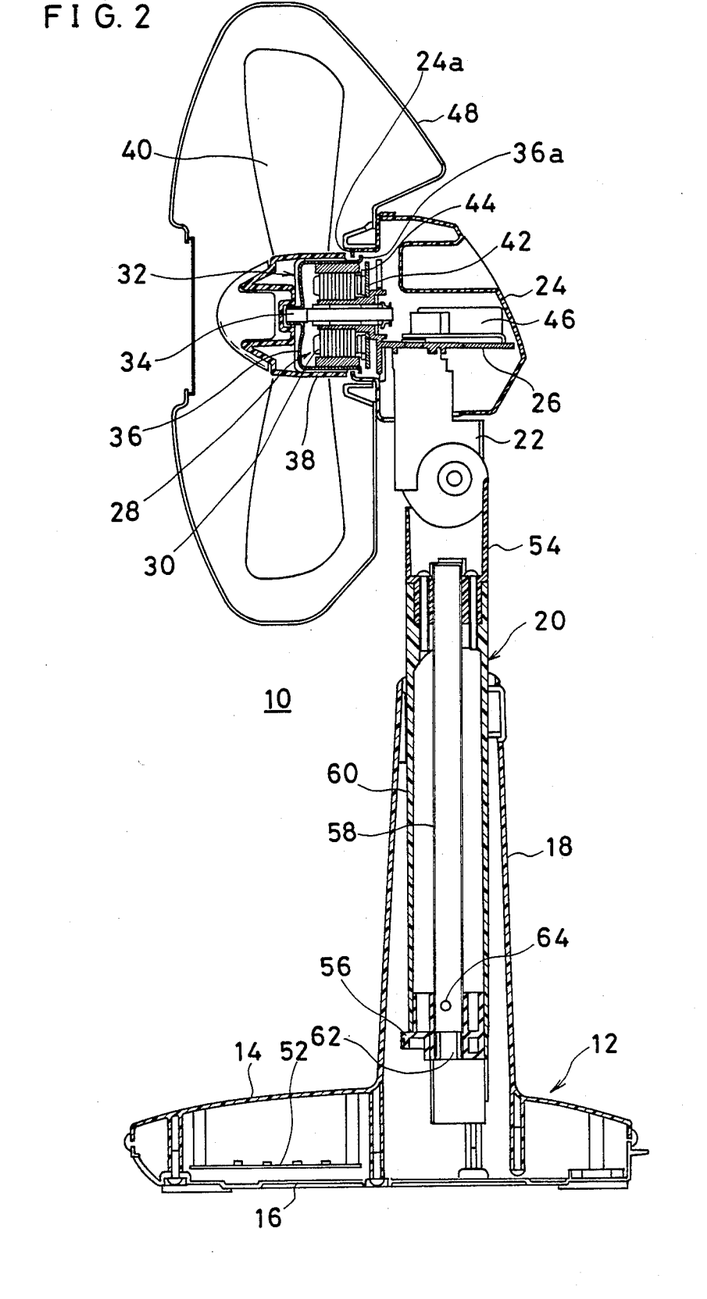
FIG. 2 is a cross-sectional schematic view showing the embodiment in detail.

FIGS. 1 and 2 illustrate one embodiment in accordance with the present invention. An electric fan 10 comprises a stand 12 which includes a stand ornament 14 and a bottom plate 16 being engaged thereto. Extending upwardly from the stand ornament 16, is formed a hollow pole brace 18 into which a supporting member 20 is inserted in a manner the same is movable vertically. On the upper end of the supporting member 20, a neck-piece 22 is supported movably in elevation.

On the neck-piece 22, as shown in FIG. 2, there is installed a motor cover 24, in which a mounting base plate 26 having a L-shaped cross section is disposed The mounting base plate 26 is, in the embodiment, moulded from the diecasting aluminum and supported by the neck-piece 22 at its one side portion.

The substantially vertical other side portion of the mounting base plate 26 bears a rotary shaft 34 of a DC brushless motor 28. The DC brushless motor 28 is constructed as an outer rotating type motor and includes an inner stator 30 consisting of windings formed around the periphery of a cylindrical body made of a magnetic material and an outer rotor 32 provided with a magnet 38 secured to the inner wall of a closed bottom cylindrical (cup-shaped) yoke 36 surrounding the stator 30 serving also as a casing. Extending generally through the center of the inner stator 30, the rotary shaft 34 is arranged and on the tip of the rotary shaft 34, the bottom of the yoke 36 described hereinabove is secured substantially at the center thereof. Accordingly, in the DC brushless motor 28, the outer rotor 32 will rotate.

An impeller 40 is secured to the tip of the rotary shaft 34 so as to cover the peripheral surface of the yoke 36 forming the outer rotor 32 by the boss thereof. More specifically, the tip of the rotary shaft 34 is threaded to screw a spinner thereon, thereby securing the impeller 40 to the rotary shaft 34.

On the rear end of the DC brushless motor 28 (right side in FIG. 2), the rotary shaft 34 is extended through and a board 42 is fixedly installed thereon. In the embodiment, a hall IC 44 is mounted on the board 42 for detecting a position of the rotor 32.

Meanwhile, as it will be apparent from FIG. 2, the peripheral edge on the opening side of the closed bottom cylindrical yoke 36 is formed with a collar 36a lifted outwardly. The peripheral edge on the opening side of the motor cover 24 is bent inwardly to form a collar 24a so as to engage to or surround the collar 36a. By the collars 24a and 36a, the penetration dusts into the motor cover 24 may be profitably prevented. More specifically, between two collars 24a and 36a, the air current flowing outwardly is produced by the rotation of the impeller 40, thereby forming a so-called air curtain and thus preventing dusts from entering therebetween. Moreover, there is an advantage that the DC brushless motor 28 is cooled by the air current between the collars 24a and 36a.

Figure 3:
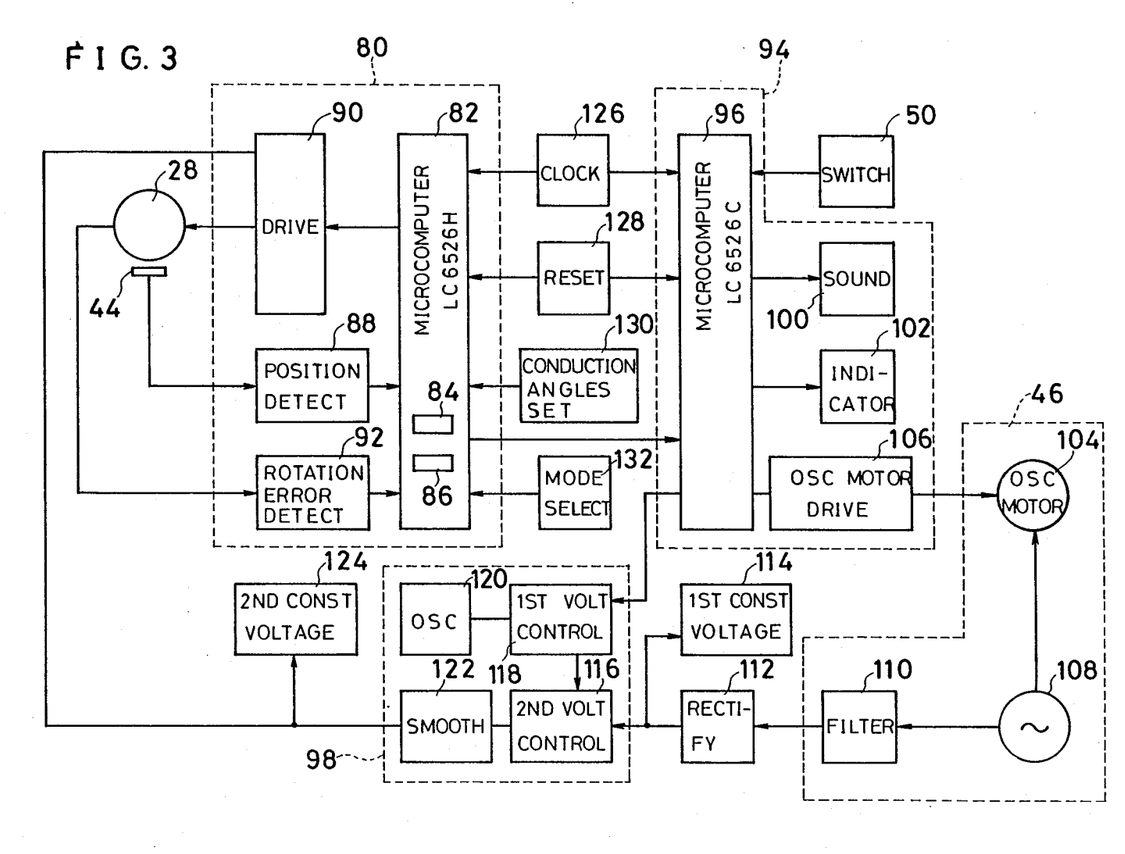
FIG. 3 is a block diagram showing an electric circuit of the embodiment.

Inside the motor cover 24, an oscillating device 46 secured on the upper surface of one side portion of the L-shaped mounting base plate 26 described above is disposed The oscillating device 46 includes an induction motor as shown in FIG. 3, and oscillates the impeller 40 on both sides through a crank mechanism (not shown). The oscillating motor may be of a DC motor.

In front of the motor cover 24, a guard 48 covering the impeller 40 is installed.

As shown in FIG. 1, on the upper surface of the stand ornament 14, there is provided a switch 50 which is connected to a board 52 disposed within the stand 12 and used for setting an operation condition such as speed and so on. The board 52 is installed within the stand 12 by means of a suitable boss, and provided with a control circuit to be explained later particularly in connection with FIGS. 3 and 4.

Referring to FIG. 2, the supporting member 20 extending through the pole brace 18 extending upwardly from the stand 12, includes a supporting portion 54 provided at its upper end for mounting the aforementioned neck-piece 22 and a telescopic guide 56 arranged at its lower end for guiding the telescopic motion thereof. The supporting member 20 consists of a tubular metal pole brace 58 and a cylinder ornament 60 covering the metal pole brace 58 and formed by moulding a synthetic resin. The cylinder ornament 60 is put on the projections formed on the aforementioned supporting portion 54 and the telescopic guide 56 at its upper and lower ends. Then, the lower end of the metal pole brace 58 is inserted into an inserting hole formed in the telescopic guide 56 to engage therewith and the upper end thereof is inserted into an inserting opening formed in the supporting portion 54 to engage therewith.

On the lower end of the inserting hole in the telescopic guide 56, a rib 62 is formed to engage the inner surface of the lower end of the metal pole brace 58. The lower portion of the cylinder ornament 60, the telescopic guide 56 and the lower portion of the metal pole brace 58 are secured in a single body by a machine screw 64 screwed in from the side.

The upper end of the metal pole brace 58 is merely inserted into the above mentioned inserting opening, and not secured together with the supporting portion 54 and the upper portion of the cylinder ornament 60. The metal pole brace 58 is, thus, freely slideable vertically within the inserting opening of the supporting portion 54. A predetermined gap is also formed in the inserting direction of the metal pole brace 58 in the inserting opening of the supporting portion 54.

In case of the extension/contraction of the supporting member 20 due to changes in the ambient temperature, a degree of extension/contraction differs between the cylinder ornament 60 made of a synthetic resin and the metal pole brace 58, the extension/contraction of the metal pole brace 58 being larger than that of the cylinder ornament 60. Accordingly, in the embodiment, as previously explained the cylinder ornament 60 and the metal pole brace 58 are secured or integrated at their lower ends, but the metal pole brace 58 is made free to extend or contract within the inserting opening of the supporting portion 54 at its upper end, thereby absorbing the difference of extension/contraction caused by the changes in temperature. The gap described above will then serve effectively for such absorption.

Figure 4:
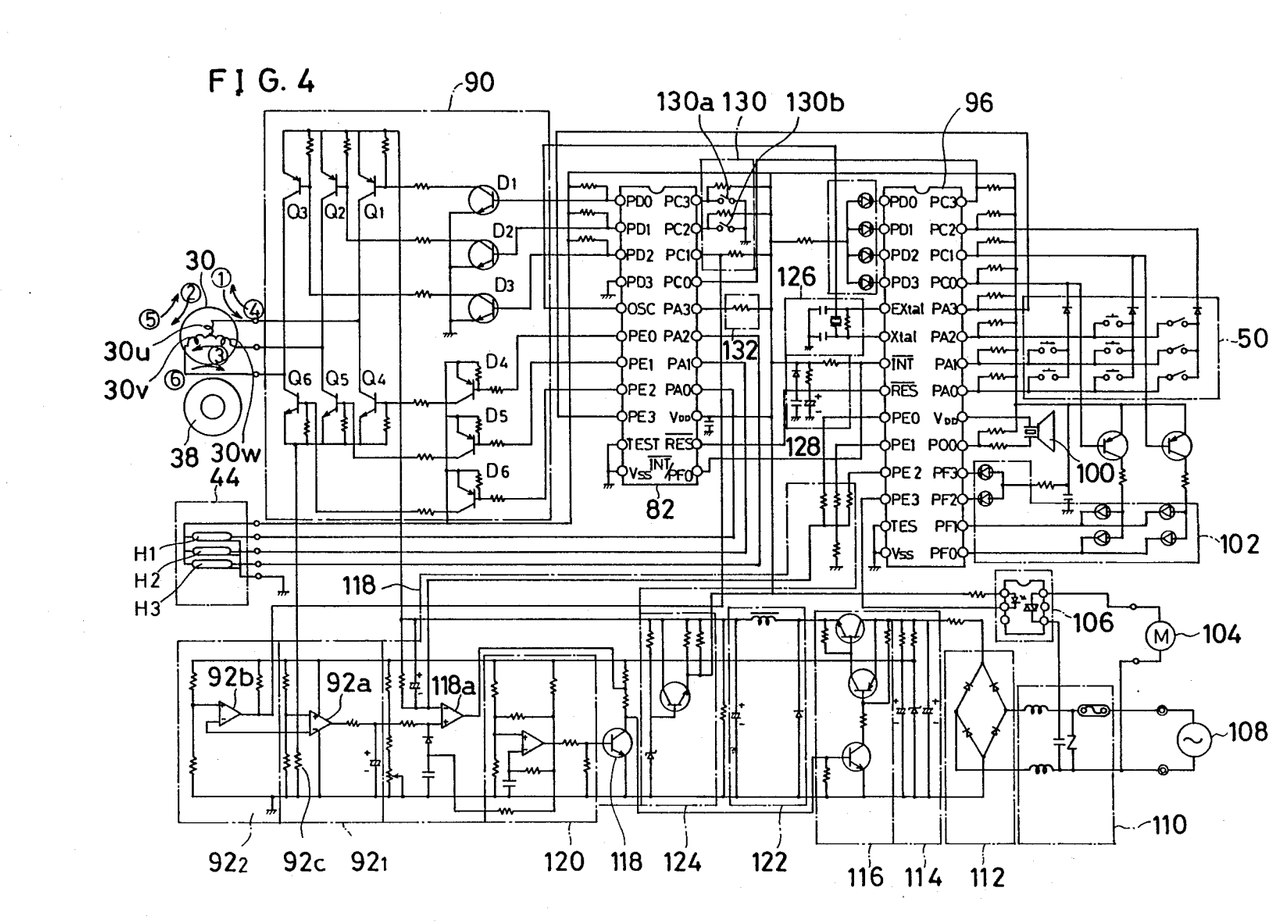
FIG. 4 is a circuit diagram showing the block diagram of FIG. 3 in detail.

Referring to FIGS. 3 and 4, for driving the DC brushless motor 28, there is provided a driving control circuit 80, which includes a microcomputer or a microprocessor 82 such as an integrated circuit "LC 6526H" by Tokyo Sanyo. In the microcomputer 82, although not shown, a memory such as ROM or RAM and a necessary input and/or output port is provided. In the memory area of the microcomputer 82, a timer 84 and a counter 86 are formed to be used in determining the timing for applying the voltage to the DC brushless motor 28 as to be explained later in detail.

In brief, on the basis of the signal from a position detecting circuit 88 receiving the signal from the hall IC 44 disposed relative to the DC brushless motor 28, the microcomputer 82 gives the control signal to a driving circuit 90 from which the necessary phase signal is given to the coil of the DC brushless motor 28 with the timing corresponding to its control signal.

Referring to FIG. 4, to the three input terminals PA0 through PA2 of the microcomputer 82, the signals from the hall elements H1 through H3 included in the hall IC 44 are given respectively. From the output terminals PD0 through PD2 and PE0 through PE2 of the microcomputer 82, the driving signals for the drivers D1 through D3 and D4 through D6 are outputted. The drivers D1 through D3 included NPN transistors and the drivers D4 through D6 included PNP transistors. Accordingly, the drivers D1 through D3 are turned on when the high level is given to their base inputs, and are turned off when the low level is given. The drivers D4 through D6 are reverse. The respective collectors of the drivers D1 through D3 are connected to the bases of the switching transistors Q1 through Q3 comprising of the PNP transistors, and the collectors of the drivers D4 through D6 are connected to the bases of the switching transistors Q4 through Q6 comprising of the NPN transistors. The emitters of the switching transistor Q1 through Q3 are commonly connected to the DC constant voltage from a smoothing circuit 122 and the emitters from the switching transistor Q4 through Q6 are commonly connected to the earth. The respectively corresponding collectors of the switching transistors Q1 through Q3 and Q4 through Q6 are commonly connected to coils 30u, 30v and 30w of the stator 30 respectively.

Accordingly, with the switching transistors Q1 and Q5 ON, the current flows from the stator coils 30u to 30w. The period of current flowing time in this direction is indicated at ① in FIG. 6. With the switching transistors Q1 and Q6 ON, the current flows from the stator coils 30u to 30v. The period of current flowing time in this direction is indicated at ② FIG. 6. With the switching transistors Q2 and Q6 ON, the current flows from the stator coils 30w to 30v. The period of current flowing time in this direction is indicated at ③ in FIG. 6. With the switching transistors Q2 and Q4 ON, the current flows from the stator coils 30w to 30u. The period of current flowing time in this direction is indicated at ④ in FIG. 6. With at the switching transistors Q3 and Q4 ON, the current flows from the stator coils 30v to 30u. The period of current flowing time in this direction is indicated at in ⑤ FIG. 6. With the switching transistors Q3 and Q5 ON, the current flows from the stator coils 30v to 30w. The period of current flowing time in this direction is indicated at ⑥ in FIG. 6.

In the driving control circuit 80, a rotation error detecting circuit 92 is installed for detecting the abnormal rotation based upon the signal from the hall IC 44. The rotation error detecting circuit 92 detects a current value applied to the DC brushless motor 28 by a resistor 92c and compare the change by the comparators 92a and 92b to control. The fault detecting circuit 92 includes two circuits $92_1$ and $92_2$, the former being inputted to a first voltage control circuit 118 and the later being inputted to the driving controller 82. The circuit $92_1$ is designed to protect the overvoltage in such a manner that, as the number of rotation is forcibly reduced when the impeller 40 and the rotor 32 rotating, for example, at 40 V 1500 r.p.m. has been effected by the external force (entwining of a curtain or the like), the current value in the resistor 92c is increased and by the output from the comparator 92a, the voltage set by the first voltage control circuit 118 is forcibly reduced from 40 V to 10 V.

The circuit $92_2$ operates as same as the circuit $92_1$, however, its setting value differs from the circuit $92_1$ and remains undissolved even at the overvoltage protection, thus when its rotation is reduced by the external force below the rotation set at 10 V, the comparator 92b outputs the signal which is inputted to a terminal PC1 of a microcomputer 84 in the driving controller 82 (the terminal PC1 which is normally at high level changes to low level then), thereby the driving controller 82 is controlled to stop the DC brushless motor 28.

There is also provided an operation control circuit 94, which on the basis of the signal from the switch 50 (FIG. 1), controls the operation such as changing the wind velocity In the operation control circuit 94, a microcomputer or a microprocessor 96 such as an integrated circuit "LC 6526C" by Tokyo Sanyo. is disposed In the microcomputer 96, the necessary input and output ports are also incorporated. The signal from the aforementioned switch 50 is given as the input signal to the microcomputer 96, which, in accordance with the input signal, controls a first voltage control circuit 118 included in a voltage controller 98 to control the voltage applied to the DC brushless motor 28, that is, its rotating speed.

Meanwhile, in the operation control circuit 94, a sound circuit 100 generating a sound responsive to the operation of the switch 50, and an indicator circuit 102 including a light emitting diode etc. indicating the operation of the switch 50 are incorporated in addition. Moreover, an oscillating motor driving circuit 106 for controlling an oscillating motor 104 incorporated in the oscillating device 46 (FIG. 2) is installed.

The oscillating motor 104 such as the induction motor receives the power from an AC power source 108, to which a filter circuit 110 is connected. The filter circuit 110 is, more definitely, consisting of coils and a capacitor as shown in FIG. 4 and used for removing the noise produced from the DC brushless motor 28 and so on. In the filter circuit 110, a circuit protective element for absorbing the surge voltage, for example, a varistor is further incorporated as shown in FIG. 4.

An AC voltage from the AC power source 108 is applied to a rectifier circuit 112 through the filter circuit 110. The rectifier circuit 112 is a full-wave rectifier circuit including diodes with bridge connections, and its output DC voltage is applied to the first constant voltage circuit 114 including a Zener diode as well as to a second voltage control circuit 116 incorporated in the voltage controller 98. The second voltage control circuit 116 acts based upon a controlling by the first voltage control circuit 118, which chops the applied DC voltage by the signal from an oscillation circuit 120. Thus, the chopped DC voltage is outputted from the second voltage control circuit 116, the output from which is smoothed by a smoothing circuit 122, DC voltage from which is applied to the driving circuit 90 of the motor driving control circuit 80.

From the rectifier circuit 112, the DC voltage having a mean value of 100 V and a peak value of approximately 141 V is outputted, which is chopped by the second voltage control circuit 116 (and the fist voltage control circuit 118) incorporated in the voltage controller 98 and applied to the smoothing circuit 122. The smoothing circuit 122 includes a capacitor and a coil, to which the saw-tooth voltage of $LI^2t/2$ is induced and smoothed by the capacitor, then applied the DC brushless motor 28 through the driving circuit 90.

At that time, the first voltage control circuit 118 is controlled by the microcomputer 96 incorporated in the driving controller 94 and changes the voltage applied to the DC brushless motor 28 or the output voltage from the smoothing circuit 122 from about 5 V up to 40 V. Thereby, the rotating speed of the DC brushless motor 28 may be changed from 250 r.p.m. up to 1500 r.p.m.

In the meantime, the DC voltage from the smoothing circuit 122 is also given to the second constant voltage circuit 124.

Since the microcomputer 82 incorporated in the driving controller 80 and the microcomputer 96 incorporated in the operation controller 94 are both arranged on the board 52(FIG. 2), a clock of e.g. 800 KHz from a clock source 126 is commonly given to them and a resetting circuit 128 is connected in common. However, in case when these microcomputers 82 and 96 are each installed on the separate boards, the clock source 126 and the resetting circuit 130 are provided separately.

To the microcomputer 82, there is also connected a conduction angle setting circuit 130, which includes two switches 130a and 130b as shown in FIG. 4, by switching these switches on and off selectively, the different conduction angles are set. The conduction angle setting circuit 130 will be described particularly hereinafter.

To the microcomputer 82, there is connected a positive/reverse rotating mode selecting circuit 132, which, in this embodiment, includes a resistor as shown in FIG. 4, thus only the positive rotation is set. However, a suitable switch may be connected to set any of two modes, the positive or reverse rotation.

The DC brushless motor 28 includes, as shown in FIG. 4, the star-connected stator coils 30u, 30v and 30w, whose neutral point is not grounded. As shown in FIG. 2, the rotor magnet 38 secured to the yoke 36 is formed as an anisotropic magnet magnetized in reverse polarity alternately in its circumferential direction. The hall IC 44 includes, as shown in FIG. 4, the hall elements H1, H2 and H3 arranged at every angle associated with respective stator coils 30u, 30v and 30w. The signals from these hall elements H1, H2 and H3 are fed to the driving controller 80 as previously described.

The driving circuit 90 includes switching transistors Q1 through Q6 for applying the voltage successively to the stator coils 30v, 30v and 30w previously described at the prescribed timing, thereby being formed as the three-phase bipolar type driving circuit. However, it is not especially limited to this type, it may be formed as the three-phase unipolar type, or the other known driving method may be further utilized.

A timer 84 incorporated in the microcomputer 82 outputs the time-up signal after the fixed time, and a counter 86 is utilized for measuring the time intervals of the position signals from the hall elements H1 through H3.

In the embodiment, for partly overlapping the conducting period to the stator coils 30u, 30v and 30w, the aforementioned conduction angle setting circuit 130 is used, thereby selecting four kinds of predetermined overlapping angles (0°, 30°, 35°, 40°) to set the overlapping ratios thereof. The conduction angles are shown in the following table.

TABLE

| Setting Switch | | Conduction | Conducting Time Ton | |
|---|---|---|---|---|
| 130a | 130 b | Angle | Calculation Formula | |
| OFF | OFF | 0° | Ton = 0 | |
| ON | OFF | 30° | Ton = $\frac{30}{60}$ | Td = $\frac{1}{2}$ Td |
| OFF | ON | 35° | Ton = $\frac{35}{60}$ | Td = $\frac{7}{12}$ Td |
| ON | ON | 40° | Ton = $\frac{40}{60}$ | Td = $\frac{2}{3}$ Td |

Figure 5:
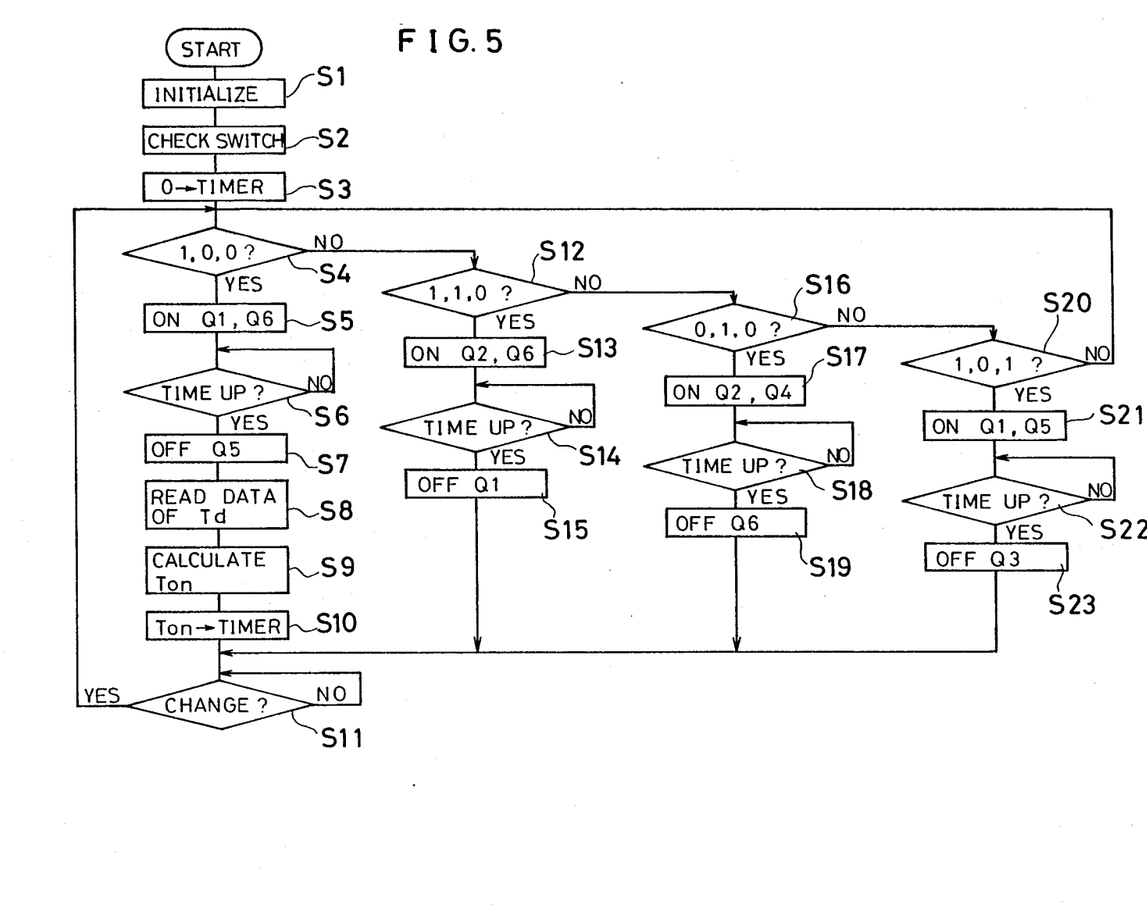
FIG. 5 is a flow diagram explaining the operation for controlling a motor in the embodiment of FIGS. 3 and 4.
Figure 6:
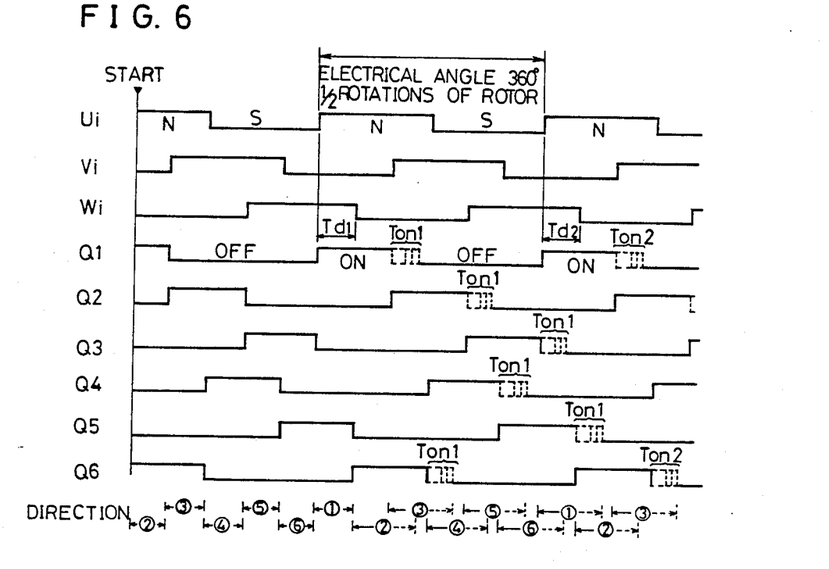
FIGS. 6 and 7 are timing diagrams for explaining the operation according to FIG. 1 respectively.
Figure 7:
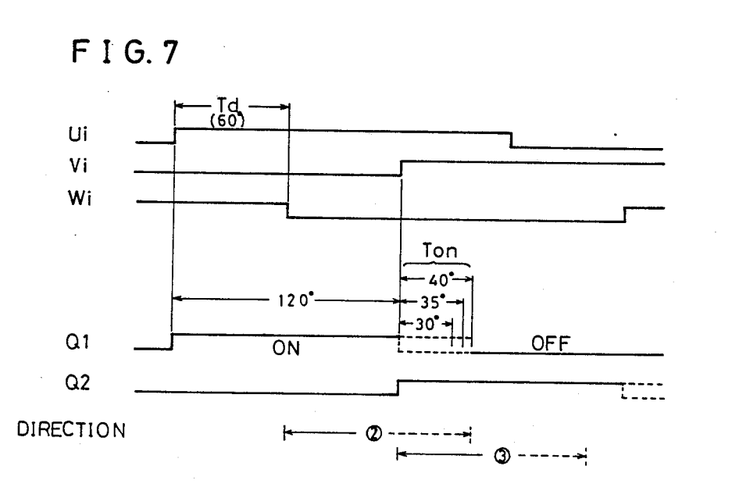

Such different conduction angles are set by operating the switches 130a and 130b incorporated in the conduction angle setting circuit 130. Although such conduction angle is set at the value where the vibration and noise is minimized during the operation of the electric fan, due to the inequality of each characteristic of the product, the value is not constant so that in practice, it is advisable to determine the optimum value through the experiment. Referring now to FIGS. 5 through 7, the operation of the microcomputer 82 for controlling such conduction angle will be explained.

When a start switch incorporated in the switch 50(FIG. 1) is pressed, the microcomputer 82 first in the step S1, cuts off the control signal to the drivers D1 through D6 and resets the timer 84 and the counter 86 to initialize. Next, in in the step S2, the microcomputer 82 checks the condition of the setting signal by the switches 130a and 130b included in the conduction angle setting circuit 130 and reads in. Then, in the following step S3, the microcomputer 82 sets the setting time "0" in the timer 84 incorporated therein.

Next, the microcomputer 82 reads in the pole position signals from the hall elements H1 through H3 as the signals Ui, Vi and Wi. Now, as shown in FIG. 6, if the pole position detecting signals at the starting time are respectively Ui="1", Vi="0" and Wi="0", this is detected in the step S4 in FIG. 5. The microcomputer 82, in the following step S5, gives the high level signal to the driver D1 and the low level signal to the driver D6, thus the drivers D1 and D6 are ON and the switching transistor Q1 and Q6 are ON.

Next, the microcomputer 82, in the step S6, gives the trigger signal to the timer 84, thus the timer 84 starts at this time. The timer 84 is designed to output the time-up signal as the set time elapses as described above, so in case when the set value is 0, it gives the timer starting command and simultaneously the time-up signal is outputted.

When the microcomputer 82 detects the time-up signal from the timer 84 in the step S6, in the step S7, the high level signal is fed to the driver D5 for turning off the switching transistor Q5, which is however, OFF in the initial state as same as the other switching transistor, thus it remains unchanged.

The conducting direction of the stator coils 30u, 30v and 30w is indicated at ② as shown in FIG. 6, so in the state of step S5, the current flows from the stator coils 30u to 30w. Thus in the DC brushless motor 28, based upon the pole generated in the stator coils 30u through 30w according to the current, the rotor magnet 38 or the yoke 36 starts to rotate. With the rotation of the yoke 36, the impeller 40 (FIGS. 1 and 2) connected thereto starts to rotate.

On the other hand, the microcomputer 82, in the following step S8, reads in the time data Td counted by the counter 86, which counts the time from the rising edge of pole position signal Ui to the falling edge of pole position signal Wi. Thus in the initial state where the pole position signals Ui and Wi are not detected yet, Td=0.

Then the microcomputer 82, in the step S9, based upon its counted time data Td and on the basis of the calculation formula shown in the previous table, calculates the conduction time Ton corresponding to the conduction angle indicated in the table. When Td=0, Ton=0 of course.

Next, in the step S10, the microcomputer 82 sets the conduction time Ton thus obtained in the timer 84. However, in the initial state, since "0" has been set in the timer 84, when setting Ton=0, the content of the timer 84 could be left unchanged.

As the rotor magnet 38 starts to rotate as described above, as shown in FIG. 6, the respective pole position signals Ui, Vi and Wi will change. When the microcomputer 82 detects the change in the step S11, it returns to the preceding step S4.

In the example shown in FIG. 6, as in the step S12 of FIG. 5, when the pole position signals Ui="1", Vi="1" and "Wi"="0" are detected, the microcomputer 82, in the step S13, gives the high level signal to the driver D2 and the low level signal to the driver D6, thus the switching transistors Q2 and Q6 are turned ON. When the time-up signal is detected in the step S14, the microcomputer 82, in the step S15, gives the low level signal to the driver D1. Thus the switching transistor Q1 is turned OFF and the switching transistors Q2 and Q6 are turned ON.

Although the switching transistor Q6 is already turned ON at the starting time, here again the high level switching signal is given thereto. This is for effecting the normal starting regardless of any state where the pole position signal exists.

When the switching transistors Q2 and Q6 are turned ON in the step S13, the current flows from the stator coils 30w to 30v in the direction ③ shown in FIG. 6 and the rotor magnet 38 rotates further, thus the pole position signal Vi through Wi change further Therefore, the process of the microcomputer 82 is returned again to the step S4.

At that time, as shown in FIG. 6, the pole position signal become Vi="0", Vi="1" and Wi="0" respectively. Accordingly, the microcomputer 82 detects the state in the step S16 and in the succeeding steps S17 through S19, turns ON the switching transistors Q2 and Q4 and turns OFF the switching transistor Q6.

Thus the conducting directions to the stator coils 30u, 30v and 30w are successively switched over whenever the pole position signals Ui, Vi and Wi are changed, and the rotor magnet 38 is shortly rotated by half.

When the rotor magnet 38 is rotated by half, the pole position signals Ui through Wi will return to the first signal pattern after completing one period, so that such conduction control is again repeated and the rotor magnet 38 is rotated further by half. Accordingly, as a result, the rotor magnet 38 is continuously rotated and the rotary shaft 34, that is, the impeller 40 is rotated continuously.

During this process, when the pole position signal Ui through Wi change from "101" in the step S20 to "100" in the step S4, the counter 86 counts the time therebetween and outputs the time data Td, which is read by the microcomputer 82 in the step S8 of FIG. 5 as previously described, when the pole position signal has changed to "100".

As shown in FIG. 7, if the switch-on period of the switching transistor Q1 is extended, for example, by the time Ton, in the conducting current to the stator coils 30u, 30v and 30w, the one flowing from the stator coils 30u to 30v indicated at ② and the one flowing from the stator coils 30w to 30v indicated at ③ tend to overlap by the time Ton. Thus if the switch-on periods of the respective switching transistors Q1 through Q6 are extended by the time Ton, the respective conducting states will shift as partly overlapping.

On the other hand, the count time data Td by the counter 86 is the time corresponding to an electrical angle 60° as shown in FIG. 6, thus as given in the previous table, the switch-on time Ton corresponding to the desired conduction angle may be calculated from the count time Td.

More specifically, when the microcomputer 82 reads in the time data Td, for example, in the step S8 of FIG. 5, as shown in the table, it calculates the switch-on time Ton corresponding to the conduction angle selected by the switches 130a and 130b in the step S9 on the basis of its calculation formula Then in the following step S10, it sets the calculated switch-on time Ton in the timer 84.

As the switch-on time Ton is set in the timer 84, as previously described, the later switch-off timing of the switching transistors Q1 through Q6 is extended by the switch-on Ton. For example, in FIG. 6, should the counter 86 has counted the time Td1, the microcomputer 82 after switching on the switching transistors Q2 and Q6 in the step S13, turns off the switching transistor Q1 after the timer 86 has detected the lapse of switch-on time Ton. Accordingly, as a result, the switch-on time of the switching transistor Q1 is extended by the calculated time Ton.

In FIG. 6, although the period of pole position signals Ui, Vi and Wi are illustrated as constant, in practice, the rotating speed at the starting time increases gradually to the constant speed, so that the period is also shortened slowly to a predetermined value. However, since the measurement of the time Td and the setting of the time Ton is made every half rotation of the magnet rotor, a fixed conduction angle corresponding to the rotating speed in that time is always set and operated at the set fixed conduction angle even after reaching the steady number of rotation.

As described above, the electric currents of each phase conduction to the stator coils 30u, 30v and 30w flow continuously as being overlapped partly, so that the ripples in the stator coil or driving coil tend to reduce. Thereby, the vibration and noise of the DC brushless motor 28 is eliminated and thus the vibration and noise of the electric fan 10 (FIG. 1), as a while, may be considerably reduced.

On the other hand, the signal is applied to the driving controller 94 from the switch 50. Supposing that, for example, a "strong wind" has been set by the switch 50, then the microcomputer 96 outputs the high level signal at its output terminals PE0 through PE2 alike. According to the signals from the output terminals PE0 through PE2, the voltage to the (−) input of the comparator 118a (FIG. 4) in the first voltage control circuit 118 incorporated in the voltage controller 98 will change. Should the output terminals PE0 through PE2 are at the high level alike, the voltage thereof increases to a maximum and a longest chopper period is attained by the second voltage control circuit 116. Thus the DC voltage from the smoothing circuit 122 becomes approximately 40 V, which is conducted and controlled by the driving circuit 90 and applied to the stator coils 30u, 30v and 30w of the DC brushless motor 28. Then the DC brushless motor 28, therefore, rotates at a maximum speed, for example, at 1450 r.p.m. and a maximum air volume is outputted from the impeller 40. On the contrary, should the output terminals PE0 through PE2 are at the low level alike, the voltage thereof decreases to a minimum and a shortest copper period is attained by the second voltage control circuit 116. Thus the DC voltage from the smoothing circuit 122 becomes approximately 5 V, which is conducted and controlled by the driving circuit 90 and applied to the stator coils 30u, 30v and 30w of the DC brushless motor 28. Then the DC brushless motor 28, therefore, rotates at a minimum speed, for example, at 250 r.p.m. and a minimum air volume is outputted from the impeller 40.

Figure 8:
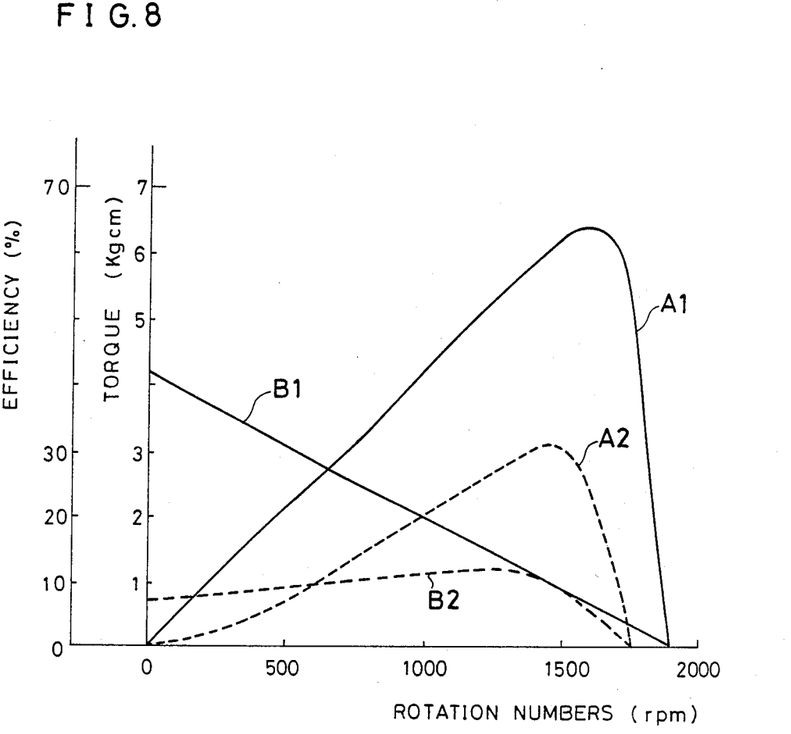
FIG. 8 is a graph for explaining the effect of the embodiment, in which the numbers of rotation are plotted along the abscissa and torques and efficiencies are plotted along the ordinate.

Thus, in the electric fan in accordance with the present invention, since the DC brushless motor is used in place of the conventional induction motor, a considerably big advantage as previously described may be obtained. Referring to FIG. 8, there is shown a graph, in which the number of rotation is plotted along the abscissa and the torque and efficiency are plotted along the ordinate. A line A1 in FIG. 8 represents the efficiency of the embodiment of the present invention and a line B1 indicates the torque thereof. Lines A2 and B2 respectively show the characteristics of efficiency and torque of the conventional electric fan using the induction motor. As it will be apparent from FIG. 8, according to the present invention, the torque in the low speed area is very large as compared with the convention one, thus the start-up may be made readily at low speed and the operation of mild wind or ultra-mild wind, for example, at 250 r.p.m. which was not possible by the conventional electric fan using the induction motor, may be possible.

That is, in the electric fan in accordance with the present invention, the maximum torque was 3.80 (kg.cm), as compared with the conventional electric fan using the induction motor, whose torque was 1.20 (kg.cm) at 50 Hz and 1.15 (kg.cm) at 60 Hz. Moreover, as to the motor efficiency, the electric fan using the DC brushless motor in accordance with the present invention was improved up to 59.1 (%) as compared with the conventional one, which was 28.5 (%) at 50 Hz and 31.0 (%) at 60 Hz.

Figure 9:
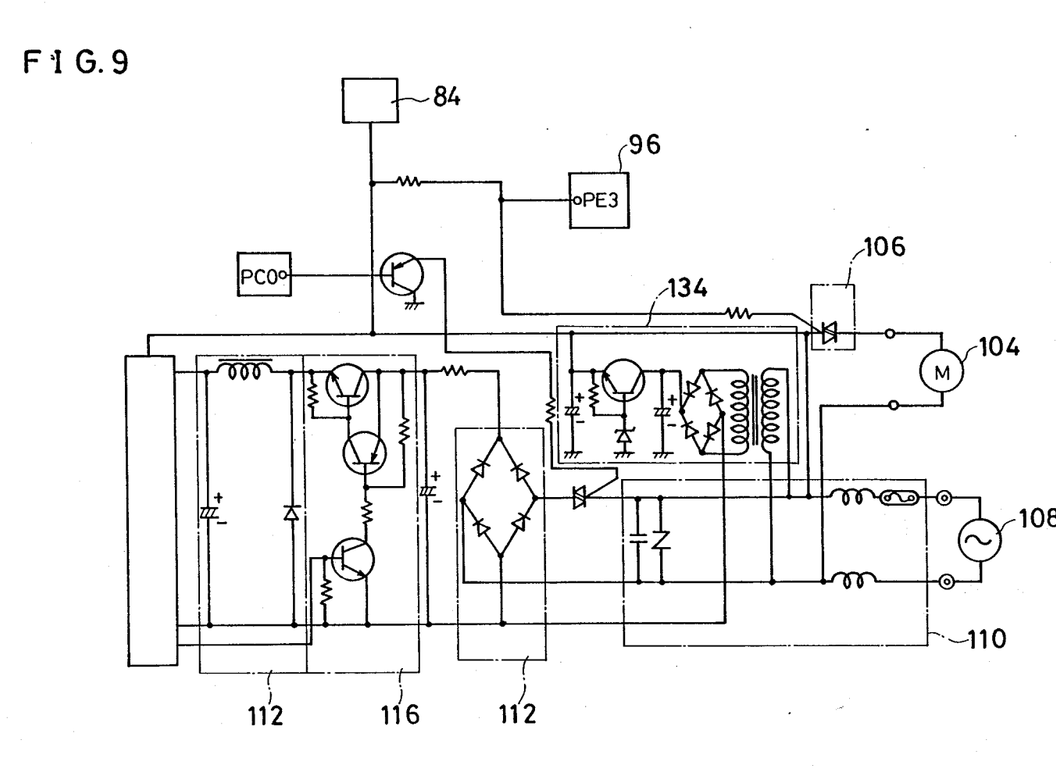
FIG. 9 is a circuit diagram of a major part showing a different example of a constant voltage circuit.

FIG. 9 is a circuit diagram showing a major portion of a further embodiment in accordance with the present invention. This embodiment is characterized by using one constant voltage circuit 134 as compared with the embodiment of FIGS. 3 and 4, forming the first and second constant voltage circuits 114 and 124 independently. The constant voltage circuit 134 couples a secondary winding to a coil disposed in the filter circuit 110, thereby obtaining the constant voltage alternating current to output the constant voltage DC voltage after rectifying thereof.

Figure 10:
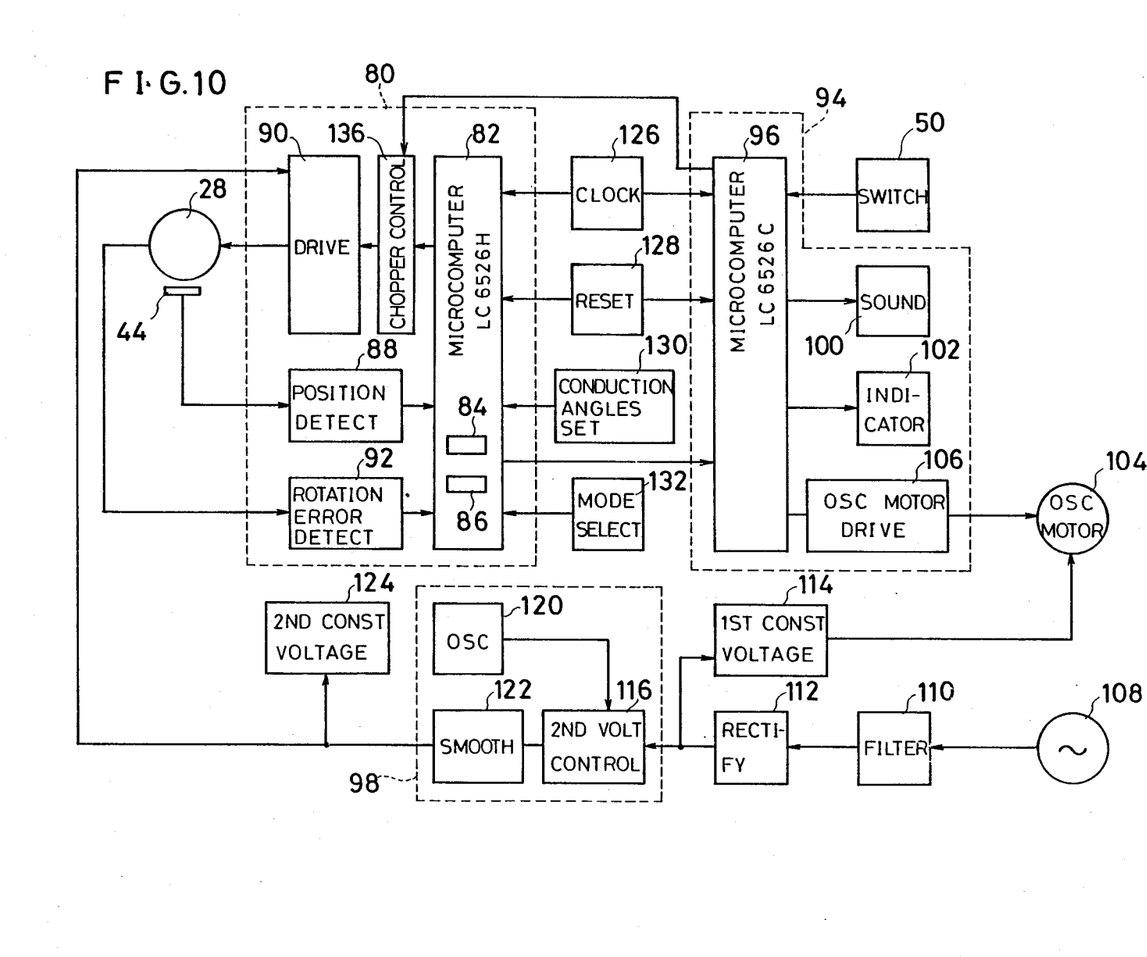
FIG. 10 is a block diagram showing the other example of an electric circuit in accordance with the present invention.

FIG. 10 is a block diagram showing a still further embodiment in accordance with the present invention. In the embodiment of FIG. 3, it was arranged to control the magnitude of DC voltage applied to the DC brushless motor 28 on the basis of the signal from the operation controller 94. However, in the embodiment, before the driving circuit 90 incorporated in the driving controller 80, there is provided a chopper circuit 136, which is controlled by the microcomputer 96 incorporated in the operation controller 94. Accordingly, in the embodiment, from the smoothing circuit 122 only the DC voltage of the constant magnitude is obtained, which is chopped by the chopper control circuit 136, consequently the DC voltage applied to the DC brushless motor 28 is controlled.

It is operated at "strong wind" in the previous embodiment at the 100% on-duty by the chopper control circuit 136. That is, the DC voltage of approximately 40 V is outputted from the smoothing circuit 122 and if the on-duty is 100%, the voltage 40 V is outputted as it is so that the DC brushless motor 28 will rotate at 1450 r.p.m.

Furthermore, in the embodiment of FIG. 10, the oscillating motor 104 is constituted by a DC motor, therefore the DC voltage from the first constant voltage circuit 114 is applied to the oscillating motor 104. Here the oscillating motor 104 may be constituted by a DC brushless motor.

Figure 11:
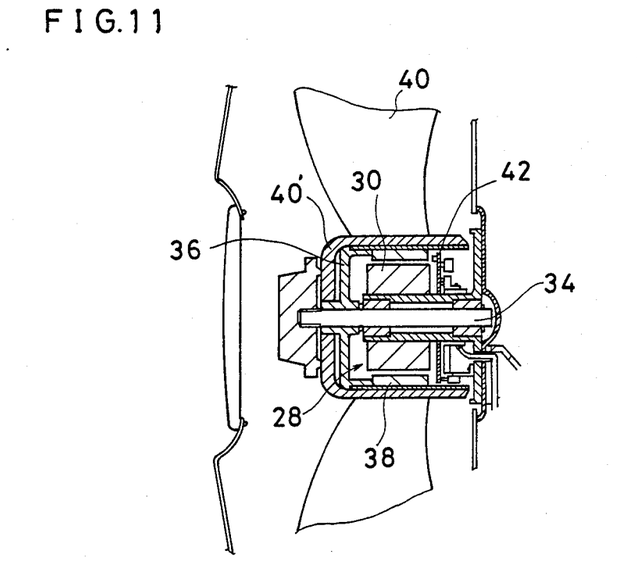
FIG. 11 is a schematic construction views of a major part showing a further embodiment in accordance with the present invention.

FIG. 11 is a schematic construction view showing a major portion of another embodiment in accordance with the present invention. In the embodiment, the yoke 36 forming the rotor 32 and the boss casing 40' of the impeller 40 are extended further backward (right side in the drawing) from the board 42 to which the hall IC 44 is to be mounted. On the board 42, not only the hall IC 44 but also the driving controller 80, voltage controller 98 and constant voltage circuits 114, 124 (or 134: FIG. 9) are incorporated. Accordingly, in the embodiment, on the board 52 secured within the stand 12 (FIG. 2), the driving controller 94, filter circuit 110 and rectifier circuit 112 and so on are assembled together, and in the embodiment, a reference clock source and a resetting circuit for respective microcomputers 82 and 96 is disposed separately.

In the embodiment, since the circuit components radiating the heat are integrally assembled on the board 42, an air current produced by the rotation of the impeller 40 serves to cool such circuit components indirectly.

If still higher cooling effect is required, air vents may be formed on the other portions such as the rotor yoke 36 and the boss casing 40'.

In the embodiment of FIG. 11, the rear edge of the rotor yoke 36 is formed to cover the board 42, so that it exhibits a shielding effect. That is, although the DC brushless motor 28 and the circuits on the board 42 may produce the noise, which is shielded by the yoke 36 and may be reduced consequently.

Furthermore, in the embodiment of FIG. 11, the rear edge of the rotor yoke 36 is formed to cover the board 42, so that it exhibits a shielding effect. That is, although the DC brushless motor 28 and the circuits on the board 42 may produce the noise, which is shielded by the yoke 36 and may be reduced consequently.

Moreover, in the embodiment of FIG. 11, since the rotor yoke 36 is long, the contact surface between the boss casing 40' of the impeller 40 and the rotor yoke 36 itself may be increased, thus the vibration of the impeller 40 may be reduced.

Meanwhile, in the embodiment, although the driving controller 80 and the operation controller 94 are formed on the separate boards 42 and 52, since the output from the operation controller 94 is only applied to the first voltage control circuit 118, connecting lead wires between the two boards 42 and 52 may not increase.

Figure 12:
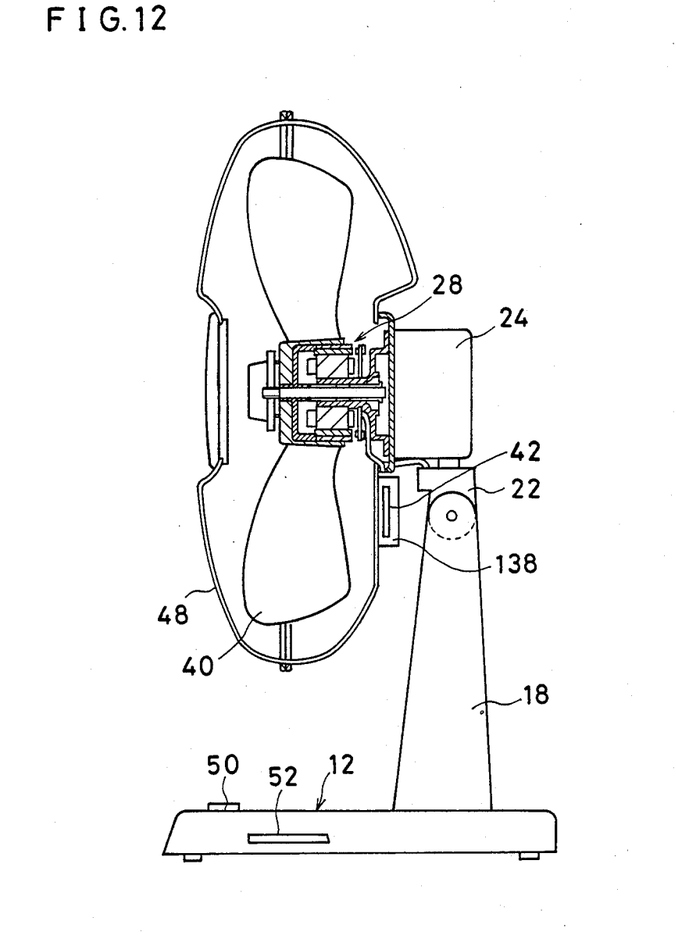
FIG. 12 is a schematic construction view showing a still further embodiment in accordance with the present invention.

FIG. 12 is a schematic construction view showing a further another embodiment in accordance with the present invention. In the embodiment, on a rear guard forming the guard 48, a box 138 for containing the aforementioned board 42 is mounted, while the board 52 is contained in the stand 12 as same as the previous embodiment. If the board 42 or the box 138 is mounted on the rear guard of the guard 48 as the embodiment, the cooling effect of the board 42 may be obtained as the previous embodiment of FIG. 12. That is, the box 136 is cooled by the air current produced by the impeller 40, thus the board 42 contained therein is cooled indirectly. The air volume blocked by the box 138 is minor and, in practice, gives no problem.

Figure 13:
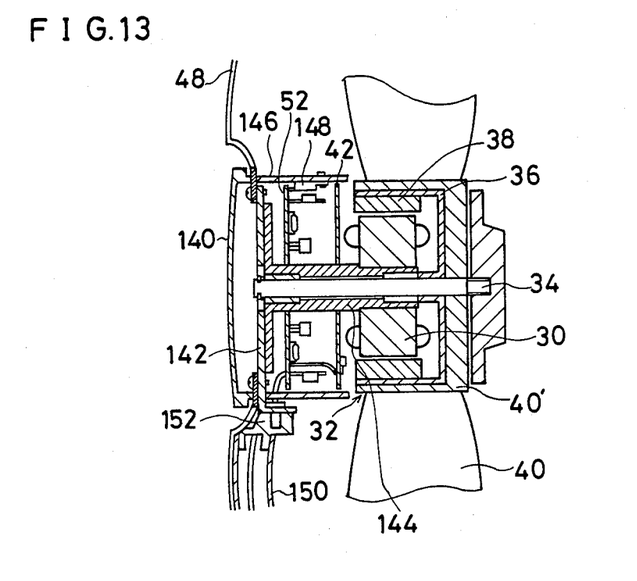
FIG. 13 is a schematic construction view of a major part showing the other embodiment in accordance with the present invention.

FIG. 13 is a schematic construction view showing a major portion f the other embodiment in accordance with the present invention. In the embodiment, the DC brushless motor 28 is secured on a center ornament 140 of a front guard of the guard 48, and the board 42 for mounting the hall IC associated with the DC brushless motor 28 and the board 52 for mounting the control circuit are installed on the portion of the ornament 140. That is, in the center of the guard 48, a supporting body 142 is fixed, to which a cylindrical mounting member 144 is secured, thereby securing the boards 42 and 52 described above. In order to cover the boards 42 and 52, there is arranged a cylindrical cover 146, to which a heat radiating plate 148 is connected, thus the heat produced by the circuit components mounted on the board 52 may be efficiently radiated. The cover 146 serves also as the shield against the noise produced from the boards 42 and 52.

The ornament 140 is mounted in the center of the front guard of the guard 48 to cover the cover 146, and the outer rotor 32 of the DC brushless motor 28 includes the yoke 36 and the rotor magnet 38 mounted therein. On the guard 48, extending downwardly from its center, a reinforcing member 150 is disposed, which is formed, for example, with a pipe and supporting the lower end of the aforementioned supporting body 142 at a connector 152 mounted on the upper end thereof. Accordingly, even if the DC brushless motor 28 or circuit boards 42 and 52 and so on are mounted in the center of the guard 48 with the moderate strength as the embodiment, they may be steadily supported.

In the embodiment described above, the DC brushless motor was all explained as the outer rotating type, however, it may be of the inner rotating type, in which case the impeller 40 is secured to the inner rotor (rotary shaft) being rotated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric fan, comprising
an impeller for producing a wind by its rotation,
a DC brushless motor coupled with said impeller at a rotor thereof and including a coil and a magnet, said coil being formed for each phase,
a driving means for applying a driving voltage to said coil of said DC brushless motor, said driving means including a plurality of switching elements, each said switching element corresponding to said coil for each said phase,
a plurality of magnetic sensing elements disposed relative to said magnet of said DC brushless motor,
a phase control mans which sequentially turns-on said plurality of switching elements in response to signals from said magnetic sensing elements to control an applied phase of said coil for each phase,
a designating means for designating operating condition,
a power control means for controlling an electric power being applied from said driving means based upon designation by said designating means,
a rotation number detecting means which detects the rotation number of said DC brushless motor based upon the signals from said magnetic sensing elements, said switching elements being change over in accordance with an angle in electrical degree which is determined based upon a time interval detected by said rotation number detecting means, and
a period defining means for defining an overlap time period during which said switching elements being turned on in an overlapped manner when said switching elements being changed over by said phase control means.

2. An electric fan in accordance with claim 1, wherein said period defining means includes means for setting said overlap time period in accordance with a conduction angle.

3. An electric fan in accordance with claim 2, wherein said period defining includes a switch.

4. An electric fan in accordance with claim 1, wherein said phase control means includes means for delaying a timing when the switching element being previously turned on i turned off by said overlap time period.

5. An electric fan in accordance with claim 1, wherein said phase control means includes a first microcomputer, to which the signals from said magnetic sensing elements are inputted and from which the control signal is applied to said driving means.

6. An electric fan in accordance with claim 1, wherein said designating means includes a manual switch.

7. An electric fan in accordance with claim 5, wherein said power control means includes a second microcomputer which receives the signal from said designating means and output a control signal for controlling said driving means.

8. An electric fan in accordance with claim 7, wherein said driving means includes a DC voltage circuit, which is controlled by said second microcomputer.

9. An electric fan in accordance with claim 1, wherein said DC brushless motor is of an inner rotating type.

10. An electric fan in accordance with claim 1, wherein said DC brushless motor is of an outer rotating type.

11. An electric fan in accordance with claim 10, wherein said DC brushless motor includes a stator having said coil and a rotor yoke covering said stator, said magnet being secured inside said rotor yoke.

12. An electric fan in accordance with claim 11, wherein said magnetic sensing elements are mounted on a first board which is arranged in the proximity of said DC brushless motor.

13. An electric motor in accordance with claim 12, wherein said first board is covered by said rotor yoke or other casing.

14. An electric fan in accordance with claim 12, which further comprises a stand for supporting said DC brushless motor and a second board arranged within said stand and being mounted with other circuit components.

15. An electric fan in accordance with claim 12, wherein on said first board, circuit components other than said magnetic sensing elements are installed.

16. An electric fan in accordance with claim 15, wherein said other circuit components include components producing the heat and said first board is arranged in the position influenced by an air flow produced by said impeller.

17. An electric fan in accordance with claim 16, which further comprises a guard surrounding said impeller, wherein said first board is supported by said guard.

18. An electric fan in accordance with claim 16, which further comprises a guard surrounding said impeller and an ornament disposed on the front of said guard, wherein said DC brushless motor and said first board are mounted on said ornament.

19. An electric fan in accordance with claim 18, wherein said second board is mounted on said ornament.

20. An electric fan in accordance with claim 3, wherein said designating means includes a speed setting means for selectively setting a speed of said DC brushless motor and said impeller out of a plurality of predetermined kinds of speeds.

21. An electric fan in accordance with claim 20, wherein said means for setting said overlap time period includes means for selectively setting an overlap time period out of a plurality kinds of overlap time periods which are predetermined as a function of the time interval of the signals from said magnetic sensing elements.

22. An electric fan, comprising
an impeller;
a DC brushless motor having a coil and a magnet for rotating said impeller, said coil being formed for each phase;
a plurality of switching elements respectively connected to said coil for each phase for bringing said coil for each phase in conduction state;
a plurality of magnetic sensing elements disposed in association with said magnet of said DC brushless motor, form which signals representative of an angle in electrical degree can be outputted;
a phase shifting means for shifting a conduction state of said coil for each phase in sequence of phases;
speed setting means for setting a speed of said DC brushless motor and thus said impeller, a time interval of said signals from said plurality of magnetic sensing elements being changed in accordance with the speed set by said speed setting means;
an overlap time determining means for determining an overlap time in shifting said conduction state of said coil for each phase by said phase shifting means, said overlap time corresponding to an angle in electrical degree which is set based upon the time interval detected in response to the signals from said plurality of magnetic sensing elements, and
a driving means for driving said plurality of switching elements in such a manner that said coil of two phases can be simultaneously brought in conduction state by said overlap time.

23. A motor controller for controlling a DC brushless motor having a coil and a magnet, said coil being formed for each phase, comprising
a plurality of switching elements respectively connected to said coil for each phase for bringing said coil for each phase in conduction state;
a plurality of magnetic sensing elements disposed in association with said magnet of said DC brushless motor, form which signals representative of an angle in electrical degree can be outputted;
a phase shifting means for shifting a conduction state of said coil for each phases in sequence of phases;
speed setting means for setting a speed of said DC brushless motor, a time interval of said signals from said plurality of magnetic sensing elements being changed in accordance with the speed set by said speed setting in accordance with the speed set by said speed setting means;
an overlap time determining means for determining an overlap time in shifting said conduction state of said coil for each phase by said phase shifting means, said overlap time corresponding to an angle in electrical degree being set based upon the time interval detected in response to the signals from said plurality of magnetic sensing elements, and
a driving means for driving said plurality of switching elements such that said coil of two phases can be simultaneously brought in conduction state by said overlap time.

24. A motor controller for controlling a DC brushless motor having a coil and a magnet, said coil being formed for each phase, comprising
a plurality of switching elements respectively connected to said coil for each phase for bringing said coil for each phase in conduction state;
a plurality of magnetic sensing element disposed in association with said magnet of said DC brushless motor, form which signals representative of an angle in electrical degree can be outputted;
a phase shifting means for shifting a conduction state of said coil for each phase in sequence of phases;
an overlap time determining means for determining an overlap time in shifting said conduction state of said coil for each phase by said phase shifting means, said overlap time corresponding to an angle in electrical degree which is set based upon a time interval detected in response to the signals from said plurality of magnetic sensing elements, and
a driving means for driving said plurality of switching elements such that said coil of two phases can be simultaneously brought in conduction state by said overlap time.

* * * * *